United States Patent [19]

Buechner et al.

[11] Patent Number: 5,006,600
[45] Date of Patent: Apr. 9, 1991

[54] PREPARATION OF PROPYLENE/ETHYLENE POLYMERS

[75] Inventors: Oskar Buechner, Dudenhofen; Wolfgang Gruber, Frankenthal, both of Fed. Rep. of Germany

[73] Assignee: BASF Aktiengesellschaft, Fed. Rep. of Germany

[21] Appl. No.: 338,419

[22] Filed: Apr. 12, 1989

Related U.S. Application Data

[63] Continuation of Ser. No. 148,641, Jan. 26, 1988, abandoned.

[51] Int. Cl.$^5$ .............................................. C08F 4/14
[52] U.S. Cl. ...................................... 525/53; 525/247; 525/270; 525/323
[58] Field of Search .................. 525/53, 247, 270, 323

[56] References Cited

U.S. PATENT DOCUMENTS

| | | | |
|---|---|---|---|
| 3,974,237 | 8/1976 | Brumbaugh et al. | 525/53 |
| 4,128,606 | 12/1978 | Furutachi et al. | 525/247 |
| 4,297,445 | 10/1981 | Short et al. | 525/52 |
| 4,334,041 | 6/1982 | Zukowski | 525/53 |
| 4,454,299 | 6/1984 | Schweier et al. | |
| 4,455,405 | 6/1984 | Jaggard et al. | 525/53 |

FOREIGN PATENT DOCUMENTS

| | | | |
|---|---|---|---|
| 0037291 | 10/1981 | European Pat. Off. | |
| 0086300 | 8/1983 | European Pat. Off. | |
| 0131268 | 1/1985 | European Pat. Off. | |
| 52-8094 | 1/1977 | Japan | |
| 84/3563 | 5/1984 | South Africa | |
| 843561 | 5/1984 | South Africa | |
| 84/5261 | 7/1984 | South Africa | |
| 978893 | 12/1964 | United Kingdom | 525/323 |

Primary Examiner—Melvyn I. Marquis
Assistant Examiner—Ralph Dean, Jr.
Attorney, Agent, or Firm—Keil & Weinkauf

[57] ABSTRACT

Propylene/ethylene polymers are prepared by a process in which, in each case in the presence of hydrogen and by means of gas phase polymerization, first (A), in a first polymerization zone, propylene is homopolymerized, and the resulting propylene homopolymer is introduced into (B) a second polymerization zone, where a mixture of propylene and ethylene is then polymerized with the reaction product obtained in (A). In this process, ethylene is homopolymerized in a further polymerization zone (C), likewise by gas phase polymerization, with certain provisos, and the resulting reaction product is likewise fed to the second polymerization zone (B).

2 Claims, No Drawings

PREPARATION OF PROPYLENE/ETHYLENE POLYMERS

This application is a continuation of application Ser. No. 148,641, filed on Jan. 26, 1988, now abandoned.

The present invention relates to a process for the preparation of propylene/ethylene polymers, in which first (A) in a first polymerization zone (Z1), propylene is homopolymerized in the presence of hydrogen as a molecular weight regulator, in a stirred bed of finely divided polymer and in the absence of a liquid reaction medium, from the gas phase, by feeding in a Ziegler-Natta catalyst system consisting of (1) a titanium catalyst component and
(2) an organoaluminum catalyst component of the formula $AlR_mX_{3-m}$, where X is OR, chlorine, bromine or hydrogen, R is a $C_1$-$C_{18}$-hydrocarbon radical and m is from 1 to 3,
(3) with or without a further catalyst component, with the provisos that, in this first polymerization zone (i) the reaction is carried out under a total pressure of from 20 to 35 bar and at from 60 to 90° C. and (ii) the ratio of the propylene partial pressure to the hydrogen partial pressure is from 100:0.1 to 100:15, and then (B) in a second polymerization zone or (Z3), a mixture of propylene and ethylene is polymerized with the propylene homopolymer present in the reaction product obtained in the first polymerization zone in the presence of hydrogen as a molecular weight regulator, in a stirred bed of finely divided polymer and in the absence of a liquid reaction medium, from the gas phase, by feeding in the reaction product obtained in the first polymerization zone, with or without additional catalyst component (2), with the provisos that, in this second polymerization zone (i) the reaction is carried out under a total pressure of from 10 to 20 bar and at from 50° to 80° C., (ii) the ratio of the propylene partial pressure to the ethylene partial pressure is from 100:10 to 100:70 and the ratio of the propylene partial pressure to the hydrogen partial pressure is from 100:2 to 100:70, and (iii) the ratio of the weight of the propylene converted to polymer in the first polymerization zone (A) to the weight of the propylene/ethylene mixture converted to polymer in the second polymerization zone (B) is from 100:10 to 100:60.

Processes of this type have been disclosed in a number of variants, and reference may be made, for example, to U.S. Pat. No. 4,454,299 and South African Patents 0084/3561, 0084/3563 and 0084/5261 as typical publications.

The known processes of the type under discussion an particular the resulting products have in general proven useful in industry, including, for example, automotive construction; however, they are still unsatisfactory in one respect or another. For example, it has to date been impossible to obtain polymers having a very advantageous balance of rigidity, toughness at room temperature and low temperature impact strength, ie. polymers which are particularly suitable for automotive construction, for example as material for bumpers or instrument panels. The production of such polymers is a worthwhile aim.

It is an object of the present invention to modify the process defined at the outset so that it permits polymers having the abovementioned property spectrum to be prepared in an advantageous manner.

We have found that this object is achieved if, in the process in question, ethylene is homopolymerized in a further polymerization zone (C) or (Z2) from the gas phase, with certain provisos, and the resulting reaction product is likewise fed to this second polymerization zone (B).

The present invention accordingly relates to a process for the preparation of propylene/ethylene polymers, in which first (A) in a first polymerization zone (Z1), propylene is homopolymerized in the presence of hydrogen as a molecular weight regulator, in a stirred bed of finely divided polymer and in the absence of a liquid reaction medium, from the gas phase, by feeding in a Ziegler-Natta catalyst system consisting of (1) a titanium catalyst component and
(2) an organoaluminum catalyst component of the formula $AlR_mX_{3-m}$, where X is OR, chlorine, bromine or hydrogen, R is a $C_1$-$C_{18}$-hydrocarbon radical and m is from 1 to 3,
(3) with or without a further catalyst component, with the provisos that, in this first polymerization zone (i) the reaction is carried out under a total pressure of from 20 to 35 bar and at from 60° to 90° C. and (ii) the ratio of the propylene partial pressure to the hydrogen partial pressure is from 100:0.1 to 100:15, and then (B) in a second polymerization zone (Z3), a mixture of propylene and ethylene is polymerized with the propylene homopolymer present in the reaction product obtained in the first polymerization zone in the presence of hydrogen as a molecular weight regulator, in a stirred bed of finely divided polymer and in the absence of a liquid reaction medium, from the gas phase, by feeding in the reaction product obtained in the first polymerization zone, with or without additional catalyst component (2), with the provisos that, in this second polymerization zone (i) the reaction is carried out under a total pressure of from 10 to 20 bar and at from 50° to 80° C., (ii) the ratio of the propylene partial pressure to the ethylene partial pressure is from 100:10 to 100:70 and the ratio of the propylene partial pressure to the hydrogen partial pressure is from 100:2 to 100:70, and (iii) the ratio of the weight of the propylene converted to polymer in the first polymerization zone (A) to the weight of the propylene/ethylene mixture converted to polymer in the second polymerization zone (B) is from 100:10 to 100:60.

In the process according to the invention, in addition, (C) in a further polymerization zone (Z2), ethylene is homopolymerized in the presence or absence of hydrogen as a molecular weight regulator, in a stirred bed of finely divided polymer and in the absence of a liquid reaction medium, from the gas phase, by means of Ziegler or Phillips catalysis, with the provisos that, in this further polymerization zone, (i) the reaction is carried out under a total pressure of from 20 to 45 bar and at from 80° to 120° C., (ii) where relevant, the ratio of the ethylene partial pressure to the hydrogen partial pressure is from 100:0.01 to 100:20 and (iii) the ratio of the weight of the propylene converted to polymer in the first polymerization zone (A) to the weight of the ethylene converted to polymer in the further polymerization zone (C) (Z2) from 100:5 to 100:40, and the resulting reaction product is likewise fed to the second polymerization zone (B).

Regarding the novel process, the following may be stated specifically:

Provided that the defining feature is taken into account, the polymerization process as such can be carried out in relevant conventional technological embodiments, in particular as a cyclic continuous process. The stated technological embodiments, ie. the technological variants of gas phase block copolymerization, are discussed in sufficient detail in the publications cited at the outset to make further description unnecessary here.

However, for completeness, it should be mentioned that, in the process according to the invention, the form of the further polymerization zone (C) and the procedure in this zone are in the general sense similar to the form of the first polymerization zone (A) and the procedure in this zone; furthermore, in these two polymerization zones, it is advantageous if the total pressure in each of these zones is detectably (ie. 5 bar or more) higher than the total pressure in the second polymerization zone (B).

Regarding the composition of the catalyst systems to be used in the novel process, the following may be stated specifically:

Titanium catalyst component (1)

The relevant conventional components are suitable here, especially those which give very uniformly round, readily free-flowing polymer particles; the following two groups which are particularly suitable for the novel process being noteworthy: (i) finely divided titanium trichloride cocrystallization product of the formula TiCl$_3 \cdot \frac{1}{3}$AlCl$_3$ and (ii) finely divided cocrystallization product of the formula TiCl$_3 \cdot \frac{1}{3}$AlCl$_3$ which is modified with electron donors or Lewis bases and have ethers or esters as modifiers, and reaction products of magnesium compounds with titanium halides with the addition of specific esters or anhydrides. Titanium catalyst components of this type are sufficiently well known from the literature (cf. for example the publications cited at the outset) and in practice that no further description is required.

Organoaluminum catalyst components (2)

Suitable organoaluminum catalyst components are once again the relevant conventional ones; they are likewise sufficiently well known from literature and in practice that no further description is required. Triethylaluminum and diethylaluminum chloride are typical examples. Further catalyst components (3) which may or may not be used The relevant conventional components, in particular phenolic substances and silane compounds, are suitable in this case too; they are likewise sufficiently well known from the literature and in practice that no further description is required here. The Ziegler and Phillips catalysts and catalyst systems for ethylene homopolymerization The relevant conventional ones are again suitable in this case, especially those which give very uniformly round, readily free-flowing polymer particles; these catalysts and catalyst systems too are sufficiently well known that no further description is required here.

In general, it may therefore be stated that the substances used in the novel process as such are the relevant conventional ones and have no special features.

EXAMPLE 1

The process is carried out by a cyclic continuous procedure in a kettle cascade consisting of three stirred kettles, each having a useful volume of 200 l; the kettles are connected in a V shape: both a kettle for the preparation of the propylene homopolymer (first polymerization zone A) and a kettle for the preparation of the ethylene homopolymer (further polymerization zone C) are upstream from the kettle for the preparation of the end product (second polymerization zone B).

The propylene/ethylene polymer is prepared by a procedure in which, first, (A) in the first polymerization zone, propylene is homopolymerized in the presence of hydrogen as a molecular weight regulator, in a stirred bed of finely divided polypropylene and in the absence of a liquid reaction medium, from the gas phase, by feeding in a Ziegler-Natta catalyst system consisting of (1) a titanium(III) component of the formula TiCl$_3 \cdot \frac{1}{3}$AlCl$_3 \cdot \frac{1}{3}$n-propyl benzoate, (2) diethylaluminum chloride and (3) n-octadecyl $\beta$-(4'-hydroxy-3', 5'-di-tert-butylphenyl)propionate (with the proviso that the atomic ratio of titanium from the titanium(III) component (1) to aluminum from the diethylaluminum chloride (2) is 1:6 and the molar ratio of diethylaluminum chloride (2) to the further catalyst component (3), ie. the n-octadecyl $\beta$-(4'-hydroxy-3', 5'-ditert-butylphenyl)propionate, is 1:0.04) with the provisos that, in the first polymerization zone, (i) the reaction is carried out under a total pressure of 28 bar and at 70° C. and (ii) the ratio of the propylene partial pressure to the hydrogen partial pressure is 100:2, and then (B) in a second polymerization zone, a propylene-/ethylene mixture is polymerized with the propylene homopolymer present in the reaction product obtained in the first polymerization zone, in the presence of hydrogen as a molecular weight regulator, in a stirred bed of finely divided polymer and in the absence of a liquid reaction medium, from the gas phase, by feeding in the reaction product obtained in the first polymerization zone, and additional catalyst component (2) in an amount such that the atomic ratio of titanium from the titanium(III) component (1) to aluminum from the additional diethylaluminum chloride (2) is 1:4, with the provisos that, in this second polymerization zone, (i) the reaction is carried out under a total pressure of 15 bar and at 55° C., (ii) the ratio of the propylene partial pressure to the ethylene partial pressure is 100:35 and the ratio of the propylene partial pressure to the hydrogen partial pressure is 100:38 and (iii) the ratio of the weight of the propylene converted to polymer in the first polymerization zone (A) to the weight of the propylene-/ethylene mixture converted to polymer in the second polymerization zone (B) is 100:30.

According to the invention, in addition (C) in a further polymerization zone, ethylene is homopolymerized in a stirred bed of finely divided polyethylene in the absence of a liquid reaction medium, from the gas phase, by means of a commercial Phillips catalyst (2% of CrO$_3$ on SiO$_2$, activated at 900° C. in a stream of air), with the provisos that, in this further polymerization zone (i) the reaction is carried out under a total pressure of 35 bar and at 108° C. and (ii) the ratio of the weight of the propylene converted to polymer in the first polymerization zone (A) to the weight of the ethylene converted to polymer in the further polymerization zone (C) is 100:17, and the resulting reaction product is likewise fed to the second polymerization zone (B).

The propylene/ethylene polymer thus obtained (26.5 kg/h) is dechlorinated, stabilized and granulated in an extruder in a conventional manner; it has a very advantageous balance of rigidity, toughness at room temperature and low temperature impact strength.

EXAMPLE 2

The process is carried out by a cyclic continuous procedure in a kettle cascade consisting of three stirred kettles, each having a useful volume of 200 l; the kettles are connected in a V shape: both a kettle for the preparation of the propylene homopolymer (first polymerization zone A) and a kettle for the preparation of the ethylene homopolymer (further polymerization zone C) are upstream from the kettle for the preparation of the end product (second polymerization zone B).

The propylene/ethylene polymer is prepared by a procedure in which, first (A) in the first polymerization zone, propylene is homopolymerized in the presence of hydrogen as a molecular weight regulator, in a stirred bed of finely divided polypropylene and in the absence of a liquid reaction medium, from the gas phase, by feeding in a Ziegler-Natta catalyst system consisting of (1) a titanium catalyst component prepared according to the Example of German Laid-Open Application DOS 3,428,478, which is described as follows:

(1.1) First, mix
    (1.1.1) titanium tetrachloride,
    (1.1.2) a modifying component consisting of
      (1.1.2.1) butyl titanate and
      (1.1.2.1) phthalic anhydride,
    (1.1.3) and magnesium ethoxide of particles size from 0.5 mm to 3 mm
taking 10 mol of magnesium alkoxide per 100 mol of titanium tetrachloride and 50 mol of titanate ester and 25 mol of phthalic anhydride per 100 mol of magnesium alkoxide and, stirring vigorously, maintain the mixture at a temperature of from 115° C. to 118° C. for 0.25 h. Collect the solid intermediate that is formed on a sintered glass filter, using suction, and wash it with heptane until the washings are colorless.

(1.2) Second, mix
    (1.2.1) titanium tetrachloride and
    (1.2.2) the solid intermediate from step (1.1)
taking 7 parts of weight of the intermediate per 100 parts by weight of titanium tetrachloride and, stirring vigorously, maintain the mixture at a temperature of from 128° C. to 134° C. for 0.5 h. Collect the solid intermediate that is formed on a sintered glass filter, using suction, and wash it with heptane until the washings are colorless.

(1.3) Third, mix
    (1.3.1) titanium tetrachloride and
    (1.3.2) the solid intermediate from step (1.2)
taking 7 parts by weight of the intermediate per 100 parts by weight of titanium tetrachloride and, stirring vigorously, maintain the mixture at a temperature of from 129° C. to 132° C. for 0.5 h. Collect the solid that is formed (the modified titanium component (1)) on a sintered glass filter, using suction, and wash it with heptane until the washings are colorless.

(2) triethylaluminum and (3) triethoxyphenylsilane (with the proviso that the atomic ratio of titanium from the titanium catalyst component (1) to aluminum from the triethylaluminum (2) is 1:150 and the molar ratio of triethylaluminum (2) to further catalyst component (3) ie. the triethoxyphenylsilane, is 1:0.1)

with the provisos that, in the first polymerization zone, (i) the reaction is carried out under a total pressure of 28 bar and at 70° C. and (ii) the ratio of the propylene partial pressure to the hydrogen partial pressure is 100:0.2, and then (B) in a second polymerization zone, a propylene-/ethylene mixture is polymerized with the propylene homopolymer present in the reaction product obtained in the first polymerization zone, in the presence of hydrogen as a molecular weight regulator, in a stirred bed of finely divided polymer and in the absence of a liquid reaction medium, from the gas phase, by feeding in the reaction product obtained in the first polymerization zone, with the provisos that, in the second polymerization zone, (i) the reaction is carried out under a total pressure of 13 bar and at 50° C., (ii) the ratio of the propylene partial pressure to the ethylene partial pressure is 100:20 and the ratio of the propylene partial pressure to the hydrogen partial pressure is 100:10, and (iii) the ratio of the weight of the propylene converted to polymer in the first polymerization zone (A) to the weight of the propylene/ethylene mixture converted to polymer in the second polymerization zone (B) is 100:40.

According to the invention, in addition (C) in a further polymerization zone, ethylene is homopolymerized in a stirred bed of finely divided polyethylene in the absence of a liquid reaction medium, from the gas phase, by means of a Ziegler catalyst as described in Example 1 of German Laid-Open Application DOS 2,543,272. The Ziegler catalyst component contains titanium and is manufactured as follows:

(1.1) First stage of manufacture

The starting materials are 20 parts by weight of silicon dioxide ($SiO_2$; I; particle diameter: from 1 to 100 $\mu$, pore volume: 2.1 cm$^3$/g, surface area: 330 M$^2$/g), suspended in 250 parts by weight of methanol, and 5 parts by weight of magnesium acetylacetonate (II), dissolved in 60 parts by weight of methanol.

The above suspension is introduced into the above solution in the course of 15 minutes at 25° C., whilst stirring, and the batch is then kept at this temperature for a further 30 minutes, with continued stirring.

The solid-phase product (III) is isolated from the suspension by stripping off the volatiles in a rotary evaporator which is brought down to an operating pressure of 100 mm HG and up to an operating temperature of 90° C.

(1.2) Second state of manufacture

The starting materials are 18 parts by weight of the product (III) obtained according to (1.1) and 5.3 parts by weight of titanium tetrachloride (IV), dissolved in 100 parts by weight of n-heptane.

The amounts correspond to a weight ratio of solid-phase product (III) to transition metal in the transition metal compound (IV) of about 1:0.07.

The above components are combined and the resulting suspension is kept at about 98° C. for 60 minutes.

The resulting suspension of the solid-phase product (V) is filtered and the product is then washed with three times 50 parts by weight of n-heptane and is dried under reduced pressure.

Analysis of the resulting product (V), i.e. of the catalyst component (1) containing titanium, indicates a titanium content of 5.2 per cent by weight.

The polymerization occurs, with the provisos that, in this further polymerization zone (i), the reaction is carried out under a total pressure of 30 bar and at 104° C.

and (ii) the ratio of the weight of the propylene converted to polymer in the first polymerization zone (A) to the weight of the ethylene converted to polymer in the further polymerization zone (C) is 100:26, and the resulting reaction product is likewise fed to the second polymerization zone (B).

The propylene/ethylene polymer thus obtained (23.7 kg/h) is dechlorinated, stabilized and granulated in an extruder in a conventional manner; it has a very advantageous balance of rigidity, toughness at room temperature and low temperature impact strength.

We claim:

1. A process for the preparation of propylene/ethylene polymers with high impact strength, in which ($A^1$) in a polymerization zone Z1, propylene is homopolymerized by gas-phase polymerization in the presence of hydrogen as a molecular weight regulator, in a reaction medium of a stirred bed of finely divided polymer by feeding into said polymerization zone Z1 a Ziegler-Natta catalyst system selected from the group consisting of systems (1) a titanium catalyst component and (2) an organoaluminum catalyst component of the formula $AlR_mX_{3-m}$, where X is OR, chlorine bromine of hydrogen, R is a $C_1$-$C_{18}$-hydrocarbon radical and m is from 1 to 3, and systems consisting of components (1) and (2) with (3) a further catalyst component, with the proviso that, in said polymerization zone Z1 (i) the reaction is carried out under a total pressure of from 20 to 35 bar and at a temperature of from 60° to 90° C., and (ii) the ratio of the propylene partial pressure to the hydrogen partial pressure is from 100:0.1 to 100:15, and ($A^2$) in a polymerization zone Z2, ethylene is homopolymerized by gas-phase polymerization in the presence or absence of hydrogen as a molecular weight regulator, in a reaction medium of a stirred bed of finely divided polymer with the proviso that, in this further polymerization zone, (i) the reaction is carried out under a total pressure of from 20 polymerization to 45 bar and at a temperature of from 80° to 120° C., (ii) where relevant, the ratio of the ethylene partial pressure to the hydrogen partial pressure is from 100:0.01 to 100:20, and (iii) the ratio of the weight of the propylene converted to polymer in said polymerization zone Z1 to the weight of the ethylene converted to polymer in said polymerization zone Z2 is in the range of from 100:5 to 100:40, (B) the reaction products obtained in polymerization zones Z1 and Z2 are fed to a polymerization zone Z3, in which a mixture of propylene and ethylene is polymerized by gas-phase polymerization in the presence of hydrogen as a molecular weight regulator, in a reaction medium of a stirred bed of finely divided polymer in the presence of the reaction products of polymerization zones Z1 and Z2 with the provisos that, in said polymerization zone Z3, (i) the reaction is carried out under a total pressure of from 10 to 20 bar and at a temperature of from 50° to 80° C., (ii) the ratio of the propylene partial pressure to the ethylene partial pressure is from 100:10 to 100:70 and the ratio of the propylene partial pressure to the hydrogen partial pressure is from 100:2 to 100:70, and (iii) the ratio of the weight of the propylene converted to polymer in polymerization zone Z1 to the weight of the propylene/ethylene mixture converted to polymer in polymerization zone Z3 is in the range of from 100:10 to 100;60.

2. The process of claim 1, wherein in polymerization zone Z3 the polymerization is carried out in the presence of additional catalyst component (2) added separately to the polymerization zone Z3.

* * * * *

UNITED STATES PATENT AND TRADEMARK OFFICE
CERTIFICATE OF CORRECTION

PATENT NO. : 5,006,600

DATED : Apr. 9, 1991

INVENTOR(S) : Oskar BUECHNER et al.

It is certified that error appears in the above-identified patent and that said Letters Patent is hereby corrected as shown below:

<u>In claim 1, Col 8, line 4:</u>

Please delete "polymerization"

Signed and Sealed this

First Day of September, 1992

Attest:

DOUGLAS B. COMER

*Attesting Officer*    *Acting Commissioner of Patents and Trademarks*